United States Patent
Huang et al.

(10) Patent No.: US 9,766,389 B2
(45) Date of Patent: Sep. 19, 2017

(54) DISPLAY DEVICE

(71) Applicant: E Ink Holdings Inc., Hsinchu (TW)

(72) Inventors: Hsin-Tao Huang, Hsinchu (TW); Chuang-Chuang Tsai, Hsinchu (TW)

(73) Assignee: E INK HOLDINGS INC., Hsinchu (TW)

( * ) Notice: Subject to any disclaimer, the term of this patent is extended or adjusted under 35 U.S.C. 154(b) by 11 days.

(21) Appl. No.: 14/810,425

(22) Filed: Jul. 27, 2015

(65) Prior Publication Data

US 2015/0331172 A1 Nov. 19, 2015

Related U.S. Application Data

(63) Continuation of application No. 13/334,416, filed on Dec. 22, 2011, now Pat. No. 9,121,978.

(51) Int. Cl.
*F21V 7/04* (2006.01)
*F21V 8/00* (2006.01)

(52) U.S. Cl.
CPC ......... *G02B 6/0031* (2013.01); *G02B 6/0035* (2013.01); *G02B 6/0036* (2013.01); *G02B 6/0018* (2013.01); *G02B 6/0055* (2013.01); *G02B 6/0061* (2013.01)

(58) Field of Classification Search
CPC .. G02B 6/0031; G02B 6/0036; G02B 6/0035; G02B 6/0061
USPC ............... 362/561, 560, 600–634, 97.1–97.3
See application file for complete search history.

(56) References Cited

U.S. PATENT DOCUMENTS

| | | | | |
|---|---|---|---|---|
| 6,816,214 B1* | 11/2004 | Ohsumi | ............... | G02B 6/0038 349/65 |
| 7,001,060 B1* | 2/2006 | Kimura | ................ | G02B 6/0053 349/63 |
| 7,671,935 B2* | 3/2010 | Mather | ................ | G02B 6/0038 349/62 |
| 2002/0135572 A1* | 9/2002 | Weindorf | ............. | G02B 6/0068 345/204 |
| 2004/0150981 A1* | 8/2004 | Katsuda | ............... | G02B 6/0088 362/620 |
| 2009/0303411 A1* | 12/2009 | Kawato | ............ | B29D 11/00605 349/61 |
| 2010/0085773 A1* | 4/2010 | Richardson | .......... | G02B 6/0036 362/615 |
| 2010/0110341 A1* | 5/2010 | Nittou | .................. | G02B 6/0031 349/67 |
| 2010/0177259 A1* | 7/2010 | Ichioka | ............. | G02F 1/133308 349/58 |

(Continued)

*Primary Examiner* — Andrew Coughlin
*Assistant Examiner* — Jessica M Apenteng
(74) *Attorney, Agent, or Firm* — Guice Patents PLLC (57) ABSTRACT

A display device includes a reflective cover, a light guide plate, and a display device. The reflective cover has an opening confined by a top inner surface, at least one side inner surface, and a bottom inner surface of the reflective cover. The light guide plate has a top surface, a bottom surface, and a side face connected to the top surface and the bottom surface, a part of the top surface is covered by the top inner surface of the reflective cover. The display device is placed under the light guide plate and a partial surface of the display device is covered by the bottom inner surface of the reflective cover. The reflective cover bonds the light guide plate and the display device together.

20 Claims, 7 Drawing Sheets

(56) References Cited

U.S. PATENT DOCUMENTS

2010/0271841 A1* 10/2010 Kim .................... G02B 6/0031
362/607

* cited by examiner

DISPLAY DEVICE

CROSS-REFERENCE TO RELATED APPLICATIONS

This application is a continuation of application Ser. No. 13/334,416, filed Dec. 22, 2011, now pending. The patent application identified above is incorporated here by reference in its entirety to provide continuity of disclosure.

BACKGROUND OF THE INVENTION

Field of the Invention

The present invention relates to a display device, especially to a display device capable of improving the efficiency in guiding light downward.

Description of the Related Art

Front light modules for transflective or reflective displays are commonly of edge-lighting type or direct-lighting type, wherein the front light modules of edge-lighting type are becoming dominant due to the market's growing demand on small form factor of displays.

Figure 1:
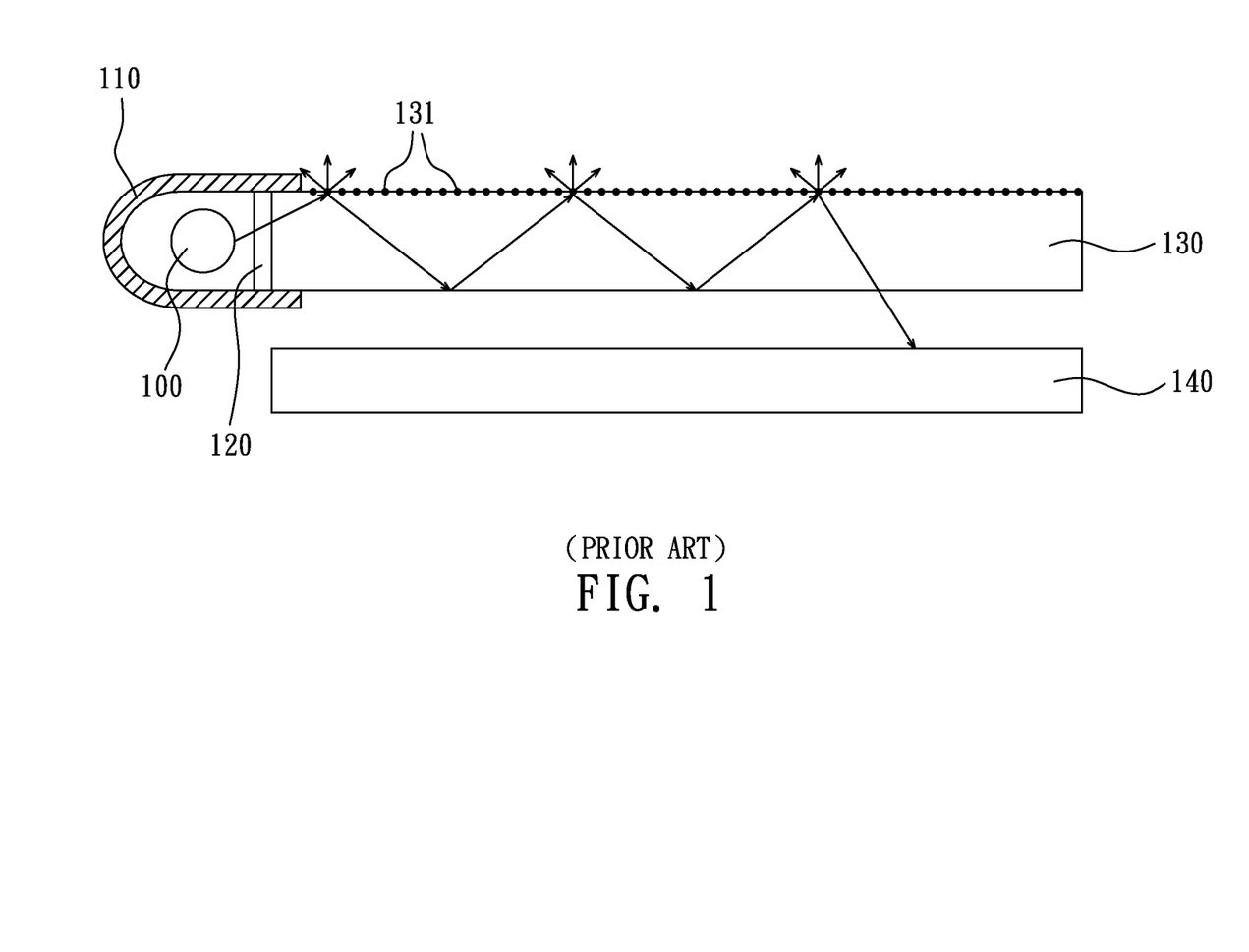
FIG. 1 illustrates a cross sectional view of a front light module for providing a plane light to illuminate a reflective type LCD according to a prior art.

A typical front light module of edge-lighting type generally installs a downward-light-guiding means on the top face of a light guide plate, to transform an edge light to a uniform plane light, which emits light beams downward to provide illumination for a display. Please refer to FIG. 1, which illustrates a cross sectional view of a front light module for providing a plane light to illuminate a reflective type LCD 140 according to a prior art. As illustrated in FIG. 1, the front light module includes a light source 100, a reflective cover 110, a diffusion plate 120, and a light guide plate 130.

In the module, the light source 100, reflective cover 110, and diffusion plate 120 are used for providing diffused incident light.

The light guide plate 130, of which the left side face is a light entrance surface close to the diffusion plate 120, the bottom face is a light exit surface, and the top face has a plurality of diffusion points 131, wherein, the diffused incident light hitting the diffusion points 131 indirectly (after going through a total reflection at the bottom face of the light guide plate 130) or directly will be scattered off, and some of the scattered light—of which the traveling direction forms with a normal line of the light exit surface an angle smaller than a total reflection angle—will pass through the light exit surface to illuminate the reflective type LCD 140.

Although the diffusion points 131 have the advantage of easy implementation (can use sand-blasting process), however, the efficiency in guiding light downward is not good enough—some of the light scattered by the diffusion points 131 will emit away from the top face of the light guide plate 130, causing energy loss.

Figure 2:
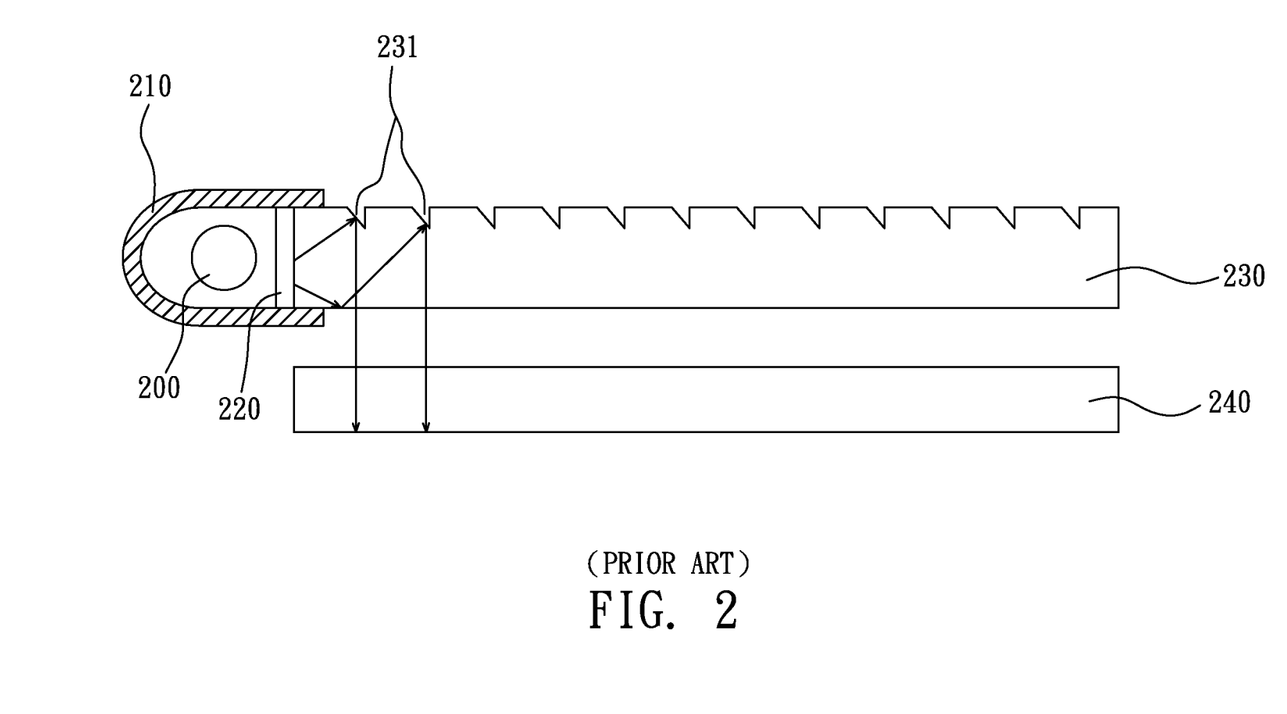
FIG. 2 illustrates a cross sectional view of a front light module for providing a plane light to illuminate a reflective type LCD according to another prior art.

To improve the efficiency in guiding light downward, there is another prior art design using microstructure as a means for guiding light downward. Please refer to FIG. 2, which illustrates a cross sectional view of a front light module for providing a plane light to illuminate a reflective type LCD 240 according to another prior art. As illustrated in FIG. 2, the front light module includes a light source 200, a reflective cover 210, a diffusion plate 220, and a light guide plate 230.

In the module, the light source 200, reflective cover 210, and diffusion plate 220 are used for providing diffused incident light.

The light guide plate 230, of which the left side face is a light entrance surface close to the diffusion plate 220, the bottom face is a light exit surface, and the top face has a plurality of V type microstructures 231, wherein, the diffused incident light hitting the V type microstructures 231 indirectly (after going through a total reflection at the bottom face of the light guide plate 230) or directly will be reflected to travel down along a normal line of the light exit surface to pass through the light exit surface to illuminate the reflective type LCD 240.

Although the V type microstructures 231 can provide better efficiency in guiding light downward, nevertheless, they have the disadvantage of being not easy to implement.

What is more, as the diffusion points 131 of the front light module of FIG. 1 and the V type microstructures 231 of the front light module of FIG. 2 are located at the top face of the light guide plate, therefore they both have the problems of interfering with a user's viewing the display and being subject to getting scratched.

In view of the foregoing problems, the present invention proposes a front light module having a novel structure for guiding light downward.

SUMMARY OF THE INVENTION

One objective of the present invention is to disclose a display device, which has a novel structure for guiding light downward more efficiently.

Another objective of the present invention is to disclose a display device having a novel structure for guiding light downward, which is easy to implement.

Still another objective of the present invention is to disclose a display device having a novel structure for guiding light downward, which can avoid interfering with a user's viewing the display.

Still another objective of the present invention is to disclose a display device having a novel structure for guiding light downward, which can avoid getting scratched.

To attain the foregoing objectives, an embodiment of the present invention provides A display device includes a reflective cover, a light guide plate, and a display device. The reflective cover has an opening confined by a top inner surface, at least one side inner surface, and a bottom inner surface of the reflective cover. The light guide plate has a top surface, a bottom surface, and a side face connected to the top surface and the bottom surface, a part of the top surface is covered by the top inner surface of the reflective cover. The display device is placed under the light guide plate and a partial surface of the display device is covered by the bottom inner surface of the reflective cover. The reflective cover bonds the light guide plate and the display device together.

To make it easier for our examiner to understand the objective of the invention, its structure, innovative features, and performance, we use preferred embodiments together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiments of the invention.

Figure 3A:
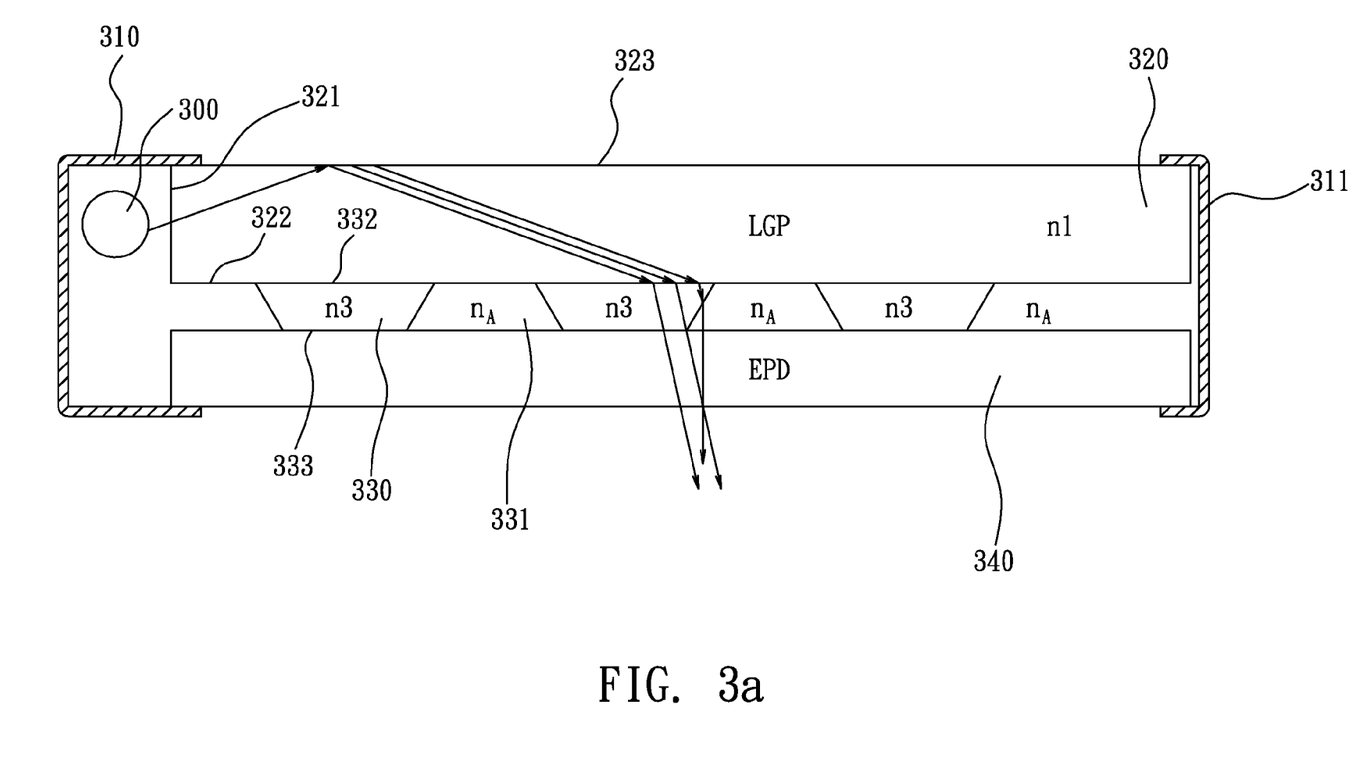
FIG. 3a illustrates a cross sectional view of a front light module according to a preferred embodiment of the present invention.

Please refer to FIG. 3a, which illustrates a cross sectional view of a front light module according to a preferred embodiment of the present invention. As illustrated in FIG. 3a, the front light module includes a light source 300, a reflective cover 310, a fixing frame 311, a light guide plate 320, a plurality of pillar structures 330, and an electronic paper device 340.

In the module, the light source 300 is used with the reflective cover 310 to provide an incident light for the light guide plate 320. The light source 300 can include a fluorescent lamp or a light emitting diode.

The reflective cover 310 and the fixing frame 311 are used for bonding the light guide plate 320, the pillar structures 330, and the electronic paper device 340 together to form a display device, and both a first width of a first opening of the reflective cover 310 and a second width of a second opening of the fixing frame 311 are preferably smaller than a total thickness of a stack of the light guide plate 320, the pillar structures 330, and the electronic paper device 340, so that the reflective cover 310 and the fixing frame 311 can produce a clamping force when they are expanded to hold the stack. The clamping force can expel the air in the interface of the pillar structures 330 and the light guide plate 320, and the air in the interface of the pillar structures 330 and the electronic paper device 340, so as to offer excellent display quality.

The light guide plate 320 has a side face 321 and a bottom surface 322 connected to the side face 321, wherein the light guide plate 320 has a first refractive index n1 and the side face 321 neighbors the light source 300 and receives the incident light. The first refractive index n1 is larger than $n_A$ (=1), so as to set a total reflection critical angle of $\sin^{-1}(1/n1)$ to avoid the incident light emitting from the top face 323 of the light guide plate 320.

Figure 3B:
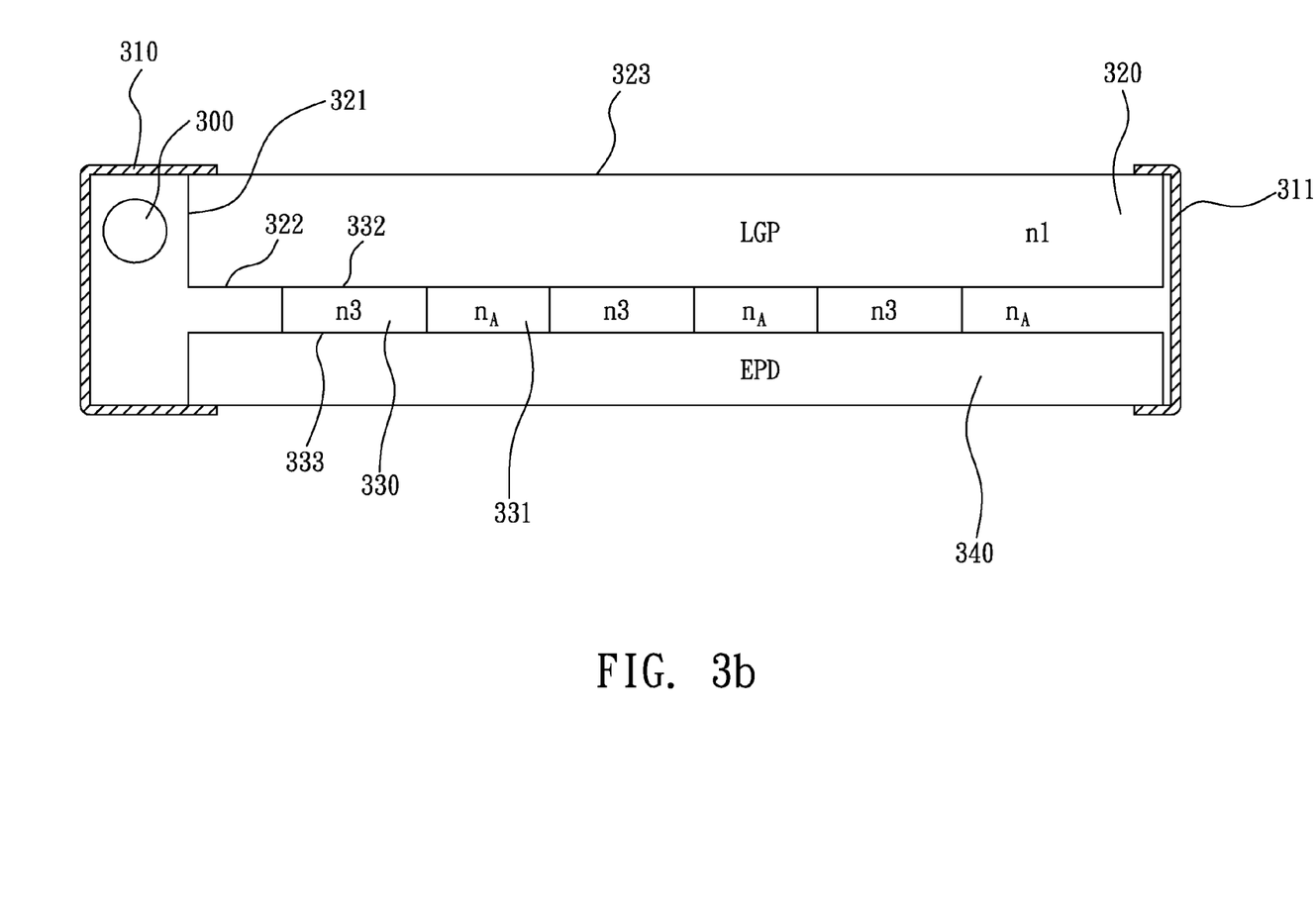
FIG. 3b illustrates a cross sectional view of a front light module according to another preferred embodiment of the present invention.
Figure 3C:
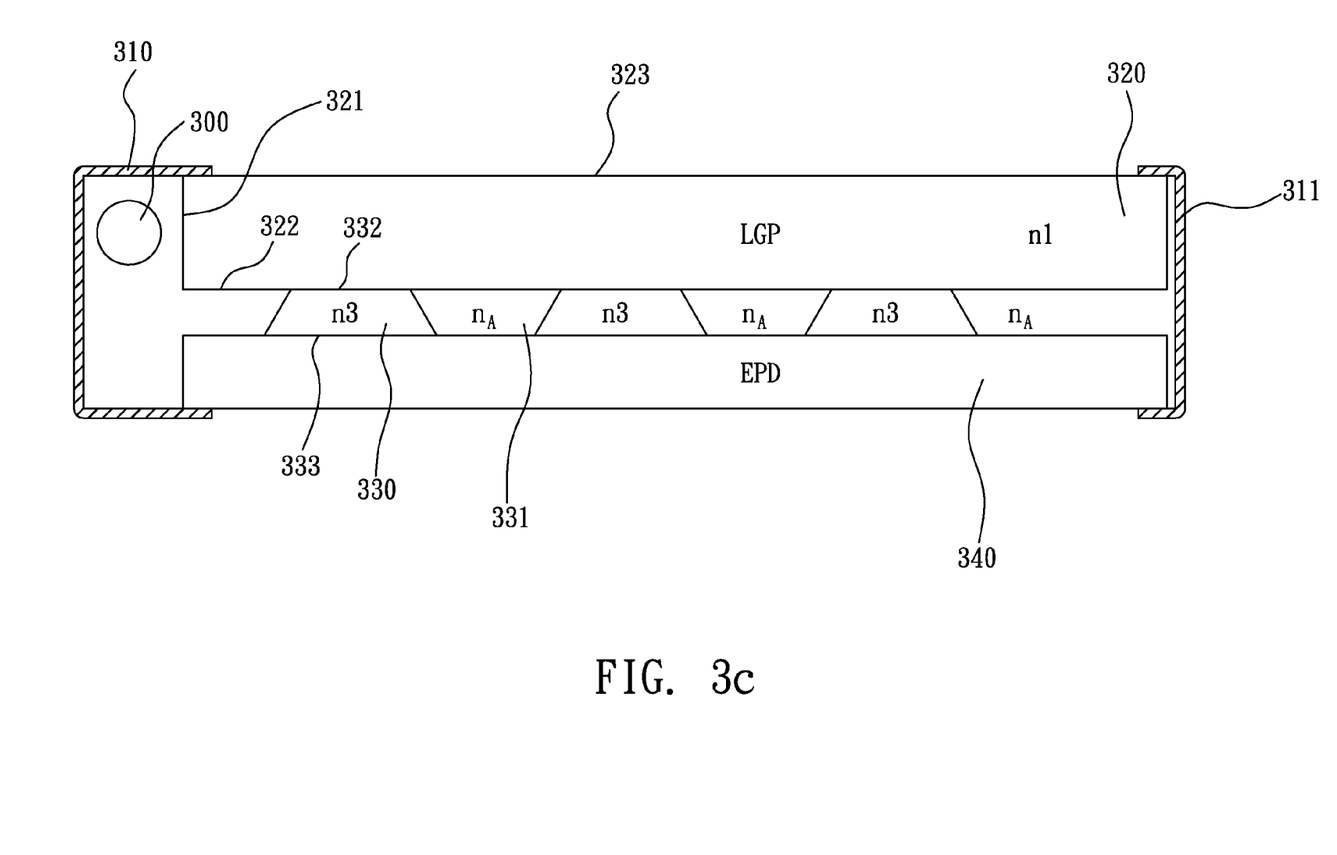
FIG. 3c illustrates a cross sectional view of a front light module according to still another preferred embodiment of the present invention.

The pillar structures 330 are placed under the bottom surface 322 of the light guide plate 320, and made of a transparent material having a second refractive index n3, and can be attached to the bottom surface 322 of the light guide plate 320 by using a screen printing process. The second refractive index n3 is larger than or equal to the first refractive index n1, so that the light travelling in the light guide plate 320 can be diverted downward when incident on the pillar structures 330. In addition, there are a plurality of gaps 331—having the refractive index $n_A$ (=1)—among the pillar structures 330 for causing the incident light totally reflected to travel right-upward. With the arrangement of the pillar structures 330 and the gaps 331, not only the light intensity on right side of the light guide plate 320 can be enhanced, but also the efficiency in guiding light downward of the light guide plate 320 can be improved, thereby providing a uniform plane light for the electronic paper device 340. Although each of the pillar structures 330 illustrated in this embodiment has a top face 332 and a bottom face 333 opposite to the top face 332, and the area of the top face 332 is larger than that of the bottom face 333, actually other shapes can also be used. For example, each of the pillar structures 330 illustrated in FIG. 3b has the area of the top face 332 equal to that of the bottom face 333, while each of the pillar structures 330 illustrated in FIG. 3c has the area of the top face 332 smaller than that of the bottom face 333.

Figure 4:
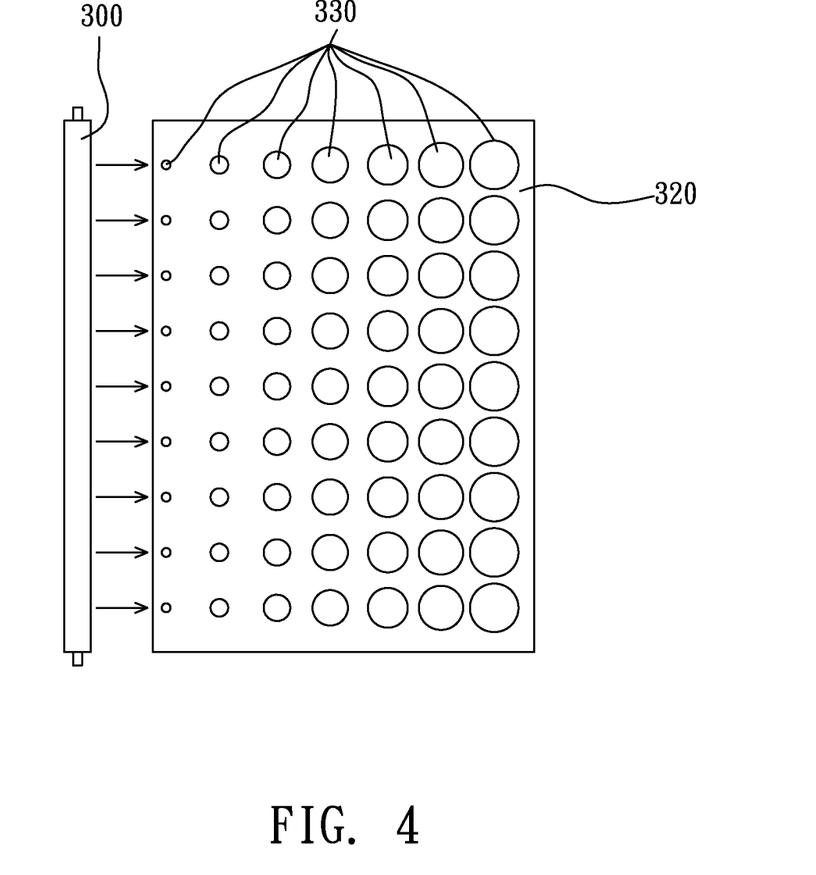
FIG. 4 illustrates a bottom view of a front light module according to still another preferred embodiment of the present invention.
Figure 5:
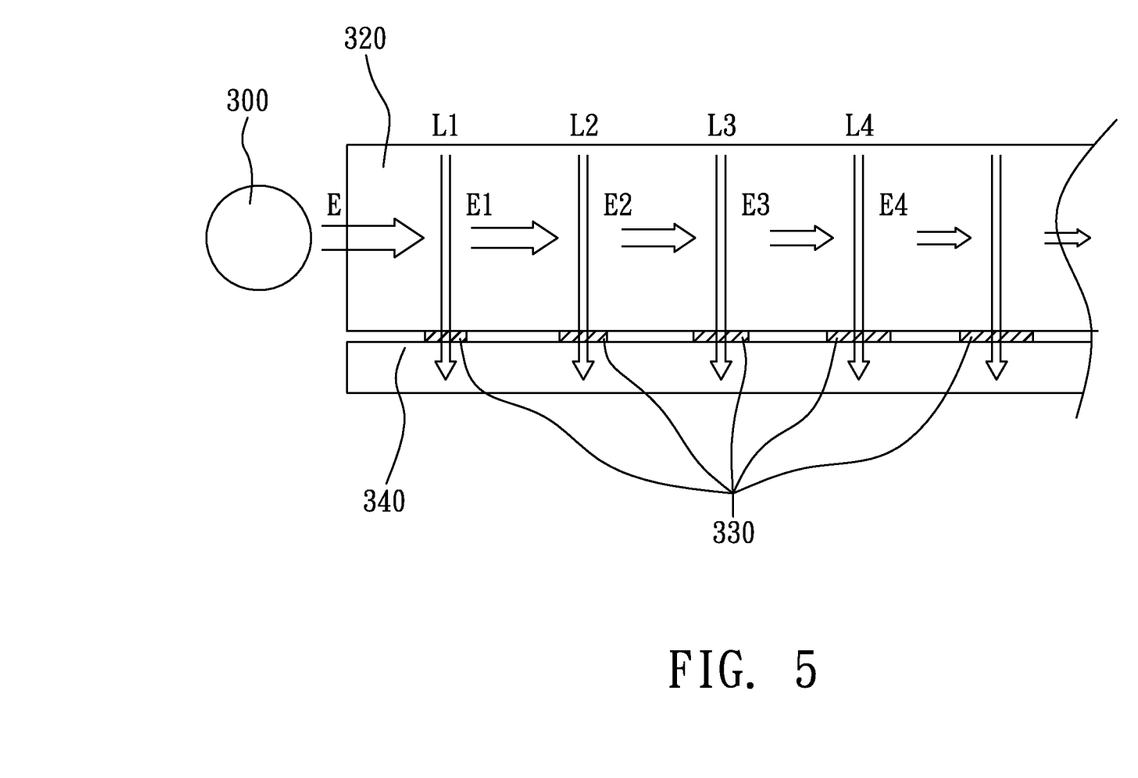
FIG. 5 illustrates the process of the incident light diverted downward by the front light module of FIG. 4.

Besides, by arranging the distribution of the pillar structures 330 in a certain way can further improve the uniformity of the plane light. Please refer to FIG. 4, which illustrates a bottom view of a front light module according to still another preferred embodiment of the present invention. As illustrated in FIG. 4, each pillar structure 330 is located a first distance from the light source 300, and the area of the top face of each pillar structure 330 varies with the first distance—the farer the first distance, the larger the area of the top face. Besides, a gap is formed between two neighboring ones of the pillar structures 300 and located a second distance from the light source 300, and the gap varies with the second distance—the gap becomes smaller as the second distance increases. With this arrangement, the ratio of the downward guided light to the totally reflected light at the bottom face 322 of the light guide plate 320 will vary with the distance between the pillar structure 330 and the light source 300—the farer the distance, the larger the ratio, so as to adjust the intensity distribution of the downward guided light over the bottom face 322 of the light guide plate 320 to provide a uniform plane light. The process of the incident light guided downward by the front light module of FIG. 4 is illustrated in FIG. 5. As can be seen in FIG. 5 that E>E1>E2>E3>E4, i.e., an incident light E has a decaying effect during the travelling process; and the distribution of the pillar structures 330—with the area of the top face 332 of the pillar structure 330 increasing gradually—compensates the decaying effect and results in uniform light beams (L1、L2、L3、L4) going downward, making L1≈L2≈L3≈L4.

In addition, the bottom faces 332 of the pillar structures 330 can be adhered to the electronic paper device 340 by a glue material, and the electronic paper device 340 can be a reflective type or transflective type display device, for example but not limited to electrophoresis display, MEMS (micro electro mechanical system) display, cholesteric liquid crystal display, electrowetting display, liquid crystal display, organic/inorganic electroluminescence display, or electrochromic display.

In conclusion, the front light module of the present invention can improve the efficiency in guiding light downward by the novel pillar structures, which can be implemented on the bottom face of a light guide plate by common manufacture processes, so as to avoid interfering with a user's viewing the display, and avoid getting scratched. Therefore, the present invention possesses superior advantages.

While the invention has been described by way of example and in terms of a preferred embodiments, it is to be understood that the invention is not limited thereto. To the contrary, it is intended to cover various modifications and similar arrangements and procedures—for example, the reflective cover 310 and the fixing frame 311 can also be implemented by a reflective tape, which can serve both the function of reflecting light beams and the function of bonding the light guide plate 320 and the electronic paper device 340 together, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A display device, comprising:
   a reflective cover, having an opening confined by a top inner surface, at least one side inner surface, and a bottom inner surface of the reflective cover, the at least one side inner surface of the reflective cover being directly connected to the top inner surface and the bottom inner surface;
   a light guide plate, having a top surface, a bottom surface, and a side face connected to the top surface and the bottom surface, a part of the top surface of the light guide plate being covered by and engaging the top inner surface of the reflective cover; and
   a display module, placed under the light guide plate and a partial surface of the display module being covered by and engaging the bottom inner surface of the reflective cover;
   wherein the at least one side inner surface, the top inner surface, and the bottom inner surface of the reflective cover provide a continued clamping force to hold the light guide plate and the display module together.

2. The display device as claim 1, wherein the reflective cover has a light source inside to provide an incident light through the opening of the reflective cover, the side face of the light guide plate neighbors the light source to receive the incident light.

3. The display device as claim 1, wherein the part of the top surface of the light guide plate covered by the top inner surface of the reflective cover is in contact with the top inner surface of the reflective cover, and the partial surface of the display module covered by the bottom inner surface of the reflective cover is in contact with the bottom inner surface of the reflective cover.

4. The display device as claim 1, wherein the at least one side inner surface comprises two side inner surfaces.

5. The display device as claim 1, further including a plurality of pillar structures placed under the bottom surface of the light guide plate.

6. The display device as claim 5, wherein the display module is adhered to the pillar structures by a glue material.

7. The display device as claim 5, wherein the opening of the reflective cover has a vertical width smaller than a total thickness of the light guide plate, the pillar structures, and the display module to provide a clamping force to expel air between the light guide plate and the pillar structures, and air between the pillar structures and the display module.

8. The display device as claim 5, wherein the light guide plate has a first refractive index and the pillar structures have a second refractive index larger than the first refractive index.

9. The display device as claim 5, wherein each the pillar structure has a top face and a bottom face opposite to the top face, the top face has a first area and the bottom face has a second area, the first area being larger than or equal to the second area.

10. The display device as claim 5, wherein each the pillar structure has a top face and a bottom face opposite to the top face, the top face has a first area and the bottom face has a second area, the first area being smaller than the second area.

11. The display device as claim 5, wherein each the pillar structure is located a first distance from a light source inside the reflective cover, each the pillar structure has a top face area varying with the first distance, and the top face area becomes larger as the first distance increases.

12. The display device as claim 11, wherein a gap is formed between two neighboring ones of the pillar structures and located a second distance from the light source, the gap varies with the second distance, and the gap becomes smaller as the second distance increases.

13. The display device as claim 1, wherein, the reflective cover is implemented with a reflective tape.

14. The display device as claim 1, wherein the display module is selected from a group consisting of electrophoresis display, MEMS (micro electro mechanical system) display, cholesteric liquid crystal display, electrowetting display, liquid crystal display, organic/inorganic electroluminescence display, and electrochromic display.

15. The display device as claim 1, wherein the opening of the reflective cover has a vertical width smaller than a total thickness of the light guide plate and the display module to provide a clamping force to expel air between the light guide plate and the display module.

16. A display device, comprising:
   a reflective cover having a first opening confined by a first top inner surface, at least one first side inner surfaces, and a first bottom inner surface of the reflective cover;
   a light guide plate, having a top surface, a bottom surface, and a side face connected to the top surface and the bottom surface, a part of the top surface of the light guide plate being covered by and engaging the first top inner surface of the reflective cover;
   a display module, placed under the light guide plate, and a partial surface of the display module being covered by and engaging the first bottom inner surface of the reflective cover; and
   a fixing frame having a second opening confined by a second top inner surface, at least one second side inner surface, and a second bottom inner surface thereof, a part of the top surface of the light guide plate being covered by and engaging the second top inner surface, and a partial surface of the display module being covered by and engaging the second bottom inner surface;
   wherein the fixing frame and the reflective cover provide a continued clamping force to hold the light guide plate and the display module together.

17. The display device as claim 16, wherein the part of the top surface of the light guide plate covered by the first top inner surface of the reflective cover is in contact with the first top inner surface of the reflective cover, the partial surface of the display module covered by the first bottom inner surface of the reflective cover is in contact with the first bottom inner surface of the reflective cover, the part of the top surface of the light guide plate covered by the second top inner surface of the fixing frame is in contact with the second top inner surface of the fixing frame, and the partial surface of the display module covered by the second bottom inner surface of the fixing frame is in contact with the second bottom inner surface of the fixing frame.

18. The display device as claim 16, further including a plurality of pillar structures placed under the bottom surface of the light guide plate.

19. The display device as claim 16, wherein the first opening has a first vertical width, the second opening has a second vertical width, and both the first vertical width and the second vertical width are smaller than a total thickness of the light guide plate and the display module to provide a clamping force to expel air between the light guide plate and the display module to promote display quality.

20. The display device as claim 18, wherein the first opening has a first vertical width, the second opening has a second vertical width, and both the first vertical width and the second vertical width are smaller than a total thickness of the light guide plate, the pillar structures, and the display module to provide a clamping force to expel air between the light guide plate and the pillar structures, and air between the pillar structures and the display module, so as to promote display quality.

* * * * *